United States Patent
Barthere et al.

(10) Patent No.: US 8,862,122 B2
(45) Date of Patent: Oct. 14, 2014

(54) MULTI-SPOT SATELLITE SURVEILLANCE SYSTEM AND RECEPTION DEVICE

(75) Inventors: Arnaud Barthere, Toulouse (FR); Erwan Corbel, Villeneuve Tolosane (FR); Thibaut Calmettes, Toulouse (FR)

(73) Assignee: THALES, Neuilly sur Seine (FR)

( * ) Notice: Subject to any disclaimer, the term of this patent is extended or adjusted under 35 U.S.C. 154(b) by 338 days.

(21) Appl. No.: 13/435,798

(22) Filed: Mar. 30, 2012

(65) Prior Publication Data

US 2013/0115874 A1    May 9, 2013

(30) Foreign Application Priority Data

Nov. 4, 2011    (FR) ...................................... 11 03354

(51) Int. Cl.
*H04B 7/185*    (2006.01)
(52) U.S. Cl.
CPC ................................. *H04B 7/18508* (2013.01)
USPC ........... 455/431; 455/427; 455/428; 455/429; 455/12.1; 455/13.1
(58) Field of Classification Search
CPC .................................................... H04B 7/18508
USPC .................................. 455/427, 428, 429, 421
See application file for complete search history.

(56) References Cited

U.S. PATENT DOCUMENTS

| | | | |
|---|---|---|---|
| 5,006,855 A * | 4/1991 | Braff .......................... | 342/357.2 |
| 6,611,226 B1 * | 8/2003 | Jones et al. .................. | 342/160 |
| 6,859,169 B2 * | 2/2005 | Jones et al. .................. | 342/352 |
| 2004/0113835 A1 * | 6/2004 | Jones et al. .................. | 342/160 |
| 2006/0035588 A1 * | 2/2006 | Chapelle ..................... | 455/13.3 |

FOREIGN PATENT DOCUMENTS

| | | |
|---|---|---|
| EP | 1223691 A2 | 7/2002 |
| EP | 2296128 A1 | 3/2011 |
| WO | 03/032525 A1 | 4/2003 |

* cited by examiner

*Primary Examiner* — Tilahun B Gesesse
(74) *Attorney, Agent, or Firm* — Baker Hostetler LLP

(57) ABSTRACT

A system for surveying aircraft present in an area covered by at least one communication satellite, the aircraft transmitting signals conveying surveillance messages. The coverage area consists of multiple spots, the satellite is configured to periodically apply a switching sequence, the sequence consisting of multiple switching phases, a switching phase corresponding to a duration during which the signals transmitted by the aircraft present in at least one spot are processed by the satellite in such a way as to detect surveillance messages, and the sequence is adapted to allow for the detection, during a predetermined period Tup, of at least one surveillance message by aircraft present in the coverage area.

13 Claims, 4 Drawing Sheets

MULTI-SPOT SATELLITE SURVEILLANCE SYSTEM AND RECEPTION DEVICE

CROSS-REFERENCE TO RELATED APPLICATIONS

This application claims priority to foreign French patent application No. FR 11 03354, filed on Nov. 4, 2011, the disclosure of which is incorporated by reference in its entirety.

FIELD OF THE DISCLOSED SUBJECT MATTER

The invention relates to a multi-spot satellite surveillance system and reception device. It applies notably to the fields of aircraft surveillance and control.

BACKGROUND

The air traffic surveillance and control systems these days exploit the capabilities offered by the GNSS satellite positioning systems (GNSS being an acronym standing for "Global Navigation Satellite System"), such as, for example, the GALILEO, GLONASS and GPS systems. The aircraft to be surveyed and controlled usually comprise onboard means enabling them to finely evaluate their position by relying on these positioning systems. The aircraft then regularly send the result of their position estimation by radio to ground control stations. The ADS-B (Automatic Dependent Surveillance-Broadcast) system is one example of a standard for a surveillance system.

The earth stations are not always in radio visibility with an aircraft broadcasting its position, for example when the latter is moving over an ocean. The issue of deploying satellites that have capabilities for receiving and transmitting surveillance signals is then raised with the manufacturers in the sector because a satellite makes it possible to cover a wide area because of its altitude and its antenna aperture which can be greater than 126° at an altitude of 780 km. The use of a satellite would then have the advantage of improving the reception of the ADS-B type surveillance messages and therefore allowing for a finer control of the aircraft. In such a system, and as illustrated by FIG. 1, a plurality of aircraft 100, 101 transmit information such as, for example, their position, to a satellite 102 covering the area in which they are located. This transmission is performed by using a communication uplink 104. The satellite 102 then retransmits this information to at least one ground station 103 by using a downlink 105.

The use of satellites in an air traffic surveillance and control system does cause a number of problems. A first problem is due to the fact that the aircraft transmit surveillance signals asynchronously, and on one and the same frequency band. When the number of aircraft present in the area of visibility of the satellite becomes very high, the probability of messages colliding rapidly increases and may become prohibitive. A collision of signals occurs when two aircraft transmit at the same time and see their messages mutually interfered with. Furthermore, a solution that is based on a satellite covering a given area using a single spot is incompatible with an acceptable link budget, that is to say, with an adequate figure of merit. As a reminder, the figure corresponds to the ratio G/T between the antenna gain G and the temperature T. Furthermore, the onboard reception device in the satellite will easily find itself in a saturation situation because the number of airplanes in visibility is too great.

It is also possible to envisage a multi-spot solution, a satellite transmitting and receiving simultaneously in its coverage area using a number M of spots. Now, this solution presupposes the implementation, in the satellite, of as many reception subsystems as there are spots. It may then be difficult, or even impossible, to include such a receiver in the payload of a satellite because of its size, its volume, the number of equipment items, the power consumed and the weight of the reception device.

SUMMARY

One aim of the invention is notably to overcome the above-mentioned drawbacks.

To this end, the subject of the invention is a system for surveying aircraft present in an area covered by at least one communication satellite, said aircraft transmitting signals conveying surveillance messages. The coverage area consists of a plurality of spots, the satellite comprising means for periodically applying a switching sequence, said sequence consisting of a plurality of switching phases, a switching phase corresponding to a duration during which the signals transmitted by the aircraft present in at least one spot are processed by the satellite in such a way as to detect surveillance messages, and said sequence being adapted in such a way as to allow for the detection, during a predetermined period Tup, of at least one surveillance message by aircraft present in the coverage area.

According to one aspect of the invention, the ADS-B standard is implemented.

The switching sequence comprises, for example, at least two switching phases of different durations.

In one embodiment, the switching sequence is adapted automatically and/or on command, according to the density of the aircraft present in the spots of the coverage area.

The duration of the switching phases and/or the number of spots processed during each phase can be chosen according to the density of the aircraft present in the spots of the coverage area.

According to one aspect of the invention, the satellite comprises multi-user detection means MUD based on interference suppression, the contribution to the signal received in a spot of a detected message being subtracted from the signals received in the adjacent spots processed during the same switching phase.

In one embodiment, the satellite comprises a plurality of receiving antennas, two antennas used to receive signals originating from two adjacent spots being configured in such a way that the first operates in right circular polarization mode and the second in left circular polarization mode.

Alternatively, the satellite comprises a plurality of receiving antennas, at least one antenna being configured in such a way that it operates both in right circular polarization mode and in left circular polarization mode.

Another subject of the invention is a reception device that can be installed in a satellite comprising means for forming a plurality of reception beams, a reception beam corresponding to a spot, all the spots forming a coverage area, and at least one reception module comprising means for detecting surveillance messages from a reception beam. The device also comprises means for periodically implementing a switching sequence, said sequence consisting of a plurality of switching phases, a switching phase corresponding to a duration during which the signals transmitted by aircraft present in at least one spot are processed in such a way as to detect surveillance messages, and said sequence being adapted in such a way as to allow for the detection, during a predetermined period Tup, of at least one surveillance message by an aircraft present in the coverage area.

According to one aspect of the invention, the reception device comprises at least two reception modules.

In one embodiment, when a reception module is out of service, the listening time Tec per beam corresponding to the time allotted for the detection of surveillance messages during an application of the switching sequence is proportionally reduced.

In another embodiment, when one of the beams fails, the switching sequence is adapted in such a way that the listening time per beam is increased for the remaining beams.

According to one aspect of the invention, the listening time per beam is increased more significantly for the spots adjacent to the failed beam than for the others.

BRIEF DESCRIPTION OF THE DRAWINGS

Other features and advantages of the invention will become apparent from the following description, given as a nonlimiting illustration, in light of the appended drawings in which.

DETAILED DESCRIPTION

The invention makes it possible to benefit from the advantages of a multi-spot solution, notably a better figure of merit for the system and a reduced number of aircraft per spot, which minimizes the probability of messages colliding.

One of the principles of the invention is to use the beam switching technique that makes it possible to benefit from the advantages of a multi-spot system while reducing the complexity, the weight, the consumption and the cost of the onboard reception device in the satellite and consequently the payload of said satellite. Advantageously, the beam switching technique is based on the characteristics of the asynchronous repetitive transmissions usually used by the surveillance systems, such as, for example, the systems implementing the ADS-B standard.

Figure 1:
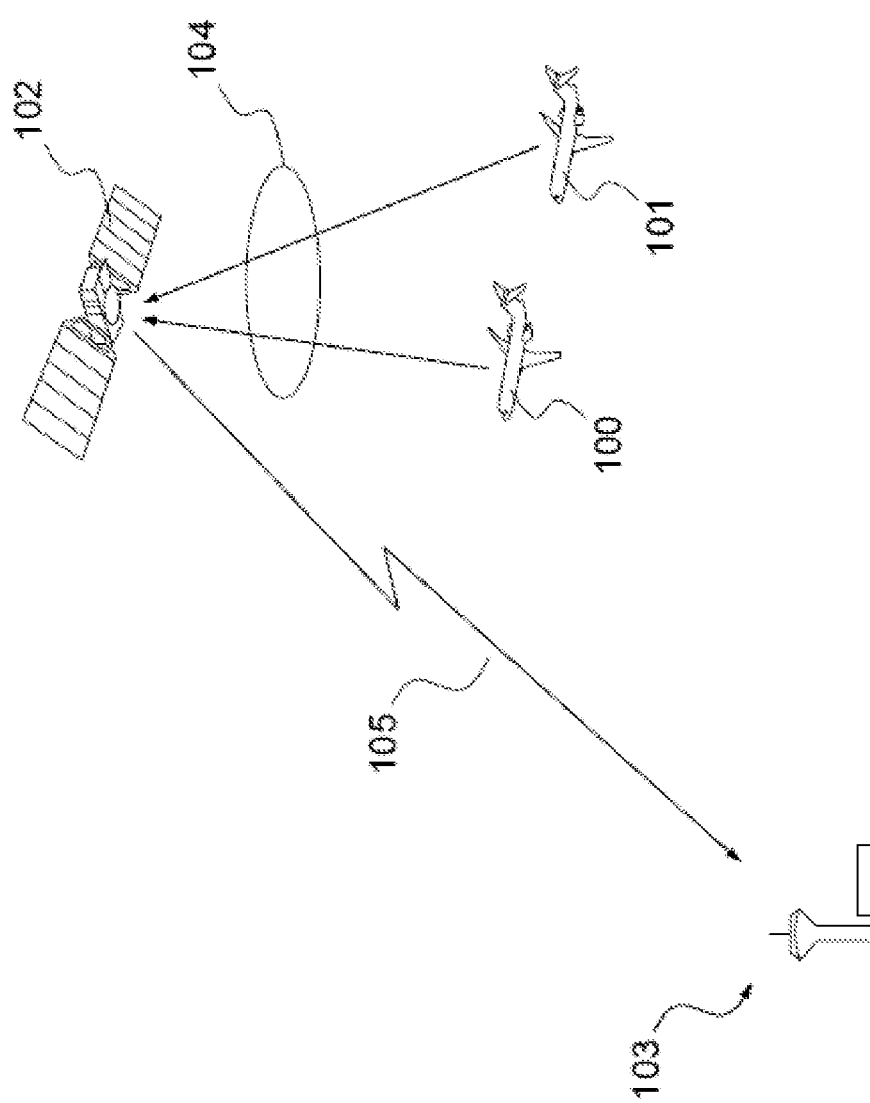
FIG. 1 illustrates the principle of a satellite aircraft surveillance system.
Figure 2:
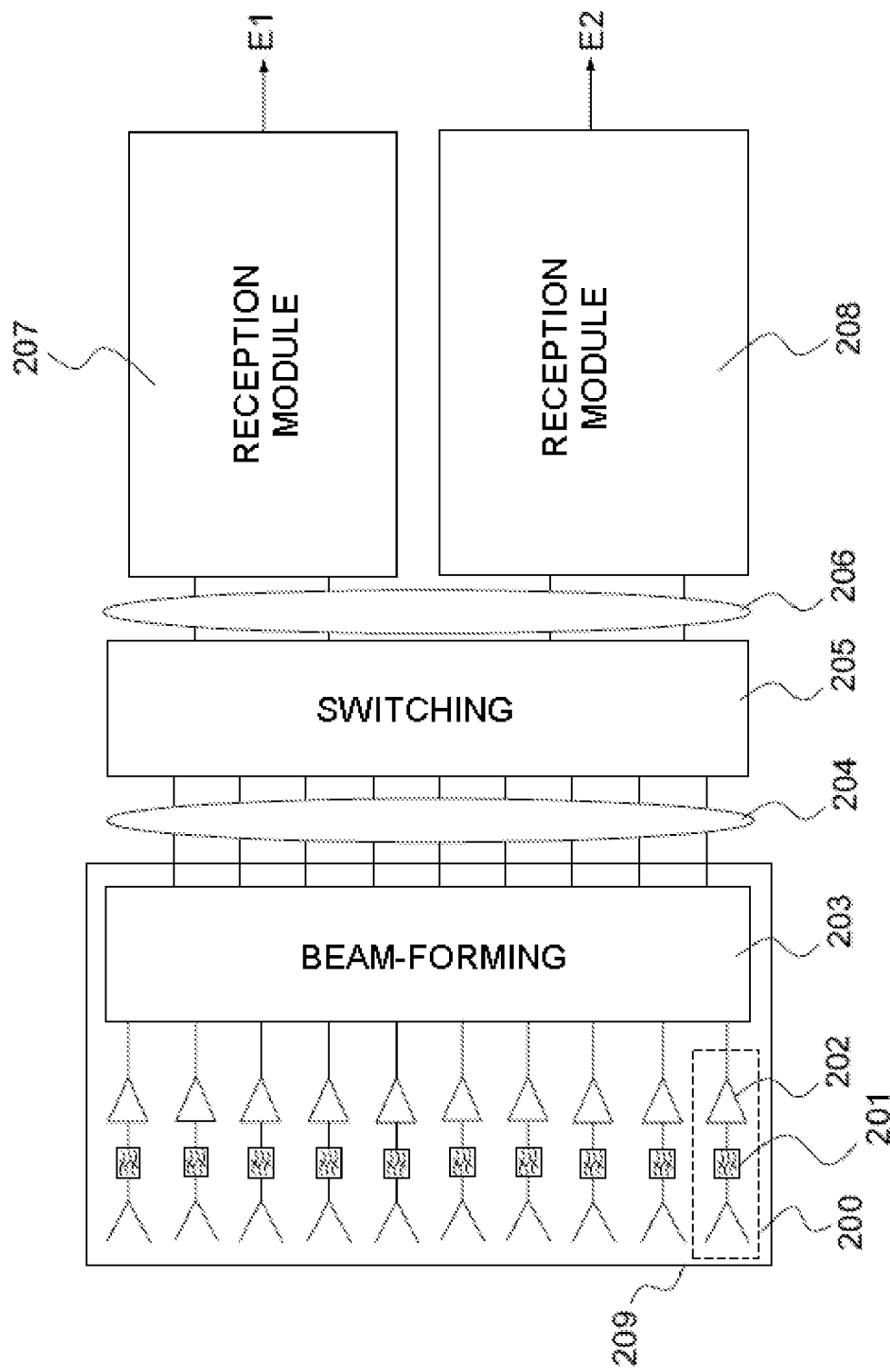
FIG. 2 gives an example of a reception device implementing the beam switching technique.

FIG. 2 gives an example of a reception device implementing the beam switching technique. In this example, the device comprises ten antennas 200, an antenna being comprised in a antenna processing subsystem 209 consisting of an input filter 201 and a low noise amplifier 202. The signals output from the amplifiers can be processed by a beam-forming equipment item 203 making it possible to obtain at the output a set of N beams 204, a beam corresponding to a reception spot. The N beams 204 are then processed by a switching equipment item 205 controlled, for example, by a switching matrix implementing a beam switching sequence. At the output of this equipment item 205, M signals 206 are generated as inputs for at least one reception module. In this example, two reception modules are represented 207, 208. The function of a reception module is to process input signals corresponding to at least one beam. It comprises radiofrequency processing means and digital processing means. These digital processing means correspond, for example, to demodulation means. The digital processing means may also comprise a channel coder and/or decoder and/or specific processing associated with the surveillance standard concerned. At the output of the reception modules 207, 208, data E1, E2 corresponding to correctly detected surveillance messages are transmitted to one or more onboard equipment items in the satellite whose function is to retransmit these messages to at least one ground station. Thus, the satellite acts as a repeater of signals transmitted by a plurality of sources distributed over its coverage area to at least one ground station, said coverage area comprising a plurality of spots.

The beam switching technique which is thus implemented makes it possible to limit the radiofrequency and digital processing resources. In fact, the implementation of a plurality of spots does not require in this case the implementation of a complete reception subsystem for each beam. In other words, the number of reception modules 207, 208 can be reduced because there is no need to have a reception module for each beam to be processed.

The transmissions of the surveillance messages are usually repetitive and asynchronous and make it possible to implement beam switching. These transmissions are repetitive because one and the same surveillance message is transmitted a number of times. These transmissions are asynchronous because the repetition of the surveillance messages does not occur at regular intervals. Hereinafter in the description, the example of the ADS-B system is used in order to describe a number of embodiments of the invention.

In an ADS-B system, these transmissions are repetitive and asynchronous and performed at an average frequency of approximately 2 Hz for the information associated with the position of the aircraft. It is therefore pointless for a repeater satellite to listen to an aircraft permanently.

Furthermore, the messages transmitted in this way have a very short duration, this duration being 120 µs in the case of the ADS-B signals.

The beam switching must be compatible with the specifications associated with the standard used. In the ADS-B context, it may be a requisite that at least one surveillance message transmission be performed successfully every period Tup=30 s for example, this value depending on the requirement in terms of spatial separation between aircraft for the air route being followed.

A switching sequence can be implemented, for example, as follows. In the context of the ADS-B standard, the maximum repetition time of a surveillance message is 0.6 seconds. The result of this is that a confirmed message requires a minimum listening time of Tec=1.2 s. In practice, a confirmed message is a message received by a ground station and therefore the content is confirmed by a second reception of the same message. This time Tec can be chosen to be the minimum listening time of an airplane that the switching sequence has to observe.

In another embodiment, the minimum listening time can be chosen in such a way that it is greater than the duration of a surveillance message, or Tec≥120 µs in the case of the ADS-B signals.

If Tec=1.2 s, the maximum number of spots Ns that can be implemented by using a single reception module is therefore equal to Ns=Tup/Tec=30/1.2=25.

The required performance levels in terms of G/T ratio make it possible to determine the minimum number of beams that enable the system to operate. The determination of the minimum number of beams has to take into account, preferably, the saturation of the reception device concerned. This number depends notably on the maximum number of aircraft visible in the coverage area of the satellite. In order to dimension the system, those skilled in the art can use air traffic models.

Figures 3A, 3B:
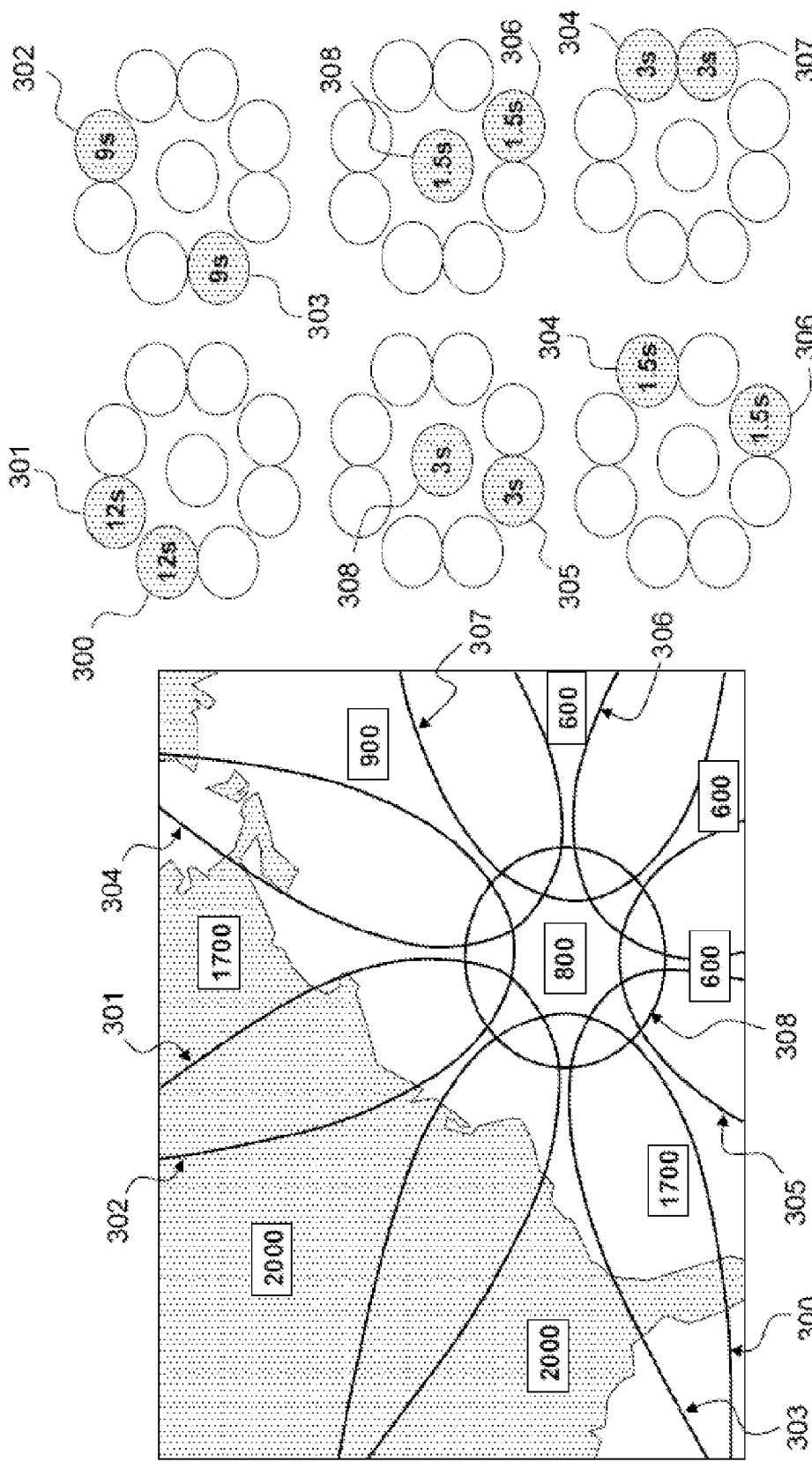
FIG. 3a gives an example of an area that can be covered by a multi-spot satellite implementing an irregular beam switching sequence.
FIG. 3b gives an example of an irregular switching sequence.

FIG. 3a gives an example of an area that can be covered by a multi-spot satellite implementing an irregular beam switching sequence. In this example, nine spots have been considered. The density of aircraft is different in each of these spots. Thus, two spots 300, 301 must allow for the reception of surveillance messages originating from two thousand aircraft on average, two other spots 302, 303 must allow for the reception of surveillance messages originating from one thousand seven hundred aircraft on average, two other spots 304, 308 must allow for the reception of surveillance messages originating from nine hundred aircraft, and four other spots 305, 306, 307 must allow for the reception of surveillance messages originating from six hundred aircraft.

FIG. 3b gives an example of an irregular switching sequence.

A switching sequence consists of a number of switching phases. A switching phase corresponds to a time band during which the onboard reception device in the satellite listens to at least one spot. The sum of the durations of the switching phases that make up the sequence is called switching period. A sequence is said to be irregular when at least two switching phases have different durations.

The spots and their associated densities are identical to what is described using FIG. 3a. In this example, it is assumed the satellite has two onboard reception modules 207, 208. Thus, said satellite has the capacity to simultaneously process the signals originating from two spots. The switching sequence comprises the following switching phases:
- the reception 309 for twelve seconds of the signals originating from the spots 300 and 301;
- the reception 310 for nine seconds of the signals originating from the spots 302 and 303;
- the reception 311 for three seconds of the signals originating from the spots 305 and 308;
- the reception 312 for a second and a half of the signals originating from the spots 306 and 308;
- the reception 313 for a second and a half of the signals originating from the spots 304 and 306;
- the reception 314 for three seconds of the signals originating from the spots 304 and 307.

The total listening time allotted for each spot is chosen in such a way as to take account of the density of aircraft present in the spots. In this example, the durations of the switching phases are determined in such a way that at least one second is allotted for two hundred aircraft present in the spot. Thus, for a spot comprising nine hundred aircraft, a switching phase with a duration equal to at least four seconds and a half will be chosen. In practice, the greater the density of aircraft, the greater the probability of collision between messages originating from different aircraft. Consequently, the listening time has to be increased in such a way as to ensure that the surveillance messages are correctly received while observing the constraint of the period Tup=30 s. In the example of FIG. 3, the switching period Tcom, that is to say, the sum of the six switching phases, is equal to thirty seconds. The constraint of the period Tup is therefore observed. It should be noted that, for the spot 308, the listening time allotted for each switching period Tcom is four seconds and a half reached in two switching phases, a first phase of three seconds and a second phase of a second and a half.

The switching sequence can be adapted automatically over time in such a way as to take account of the traffic variations and therefore of the density of aircraft present in each spot. The conventional supervision mechanisms of the demodulator of a satellite make it possible to know the number of aircraft in each spot. Based on this information, the sequence can be automatically modified by using an onboard algorithm in the satellite.

The automatic adaptation of the sequence can be performed by using the result produced by a supervision module of the demodulator. The function of this module embedded in the reception device is to produce an indicator representative of the number of aircraft present in each spot. This indicator can be determined as follows:
- For a spot for which the listening time is not sufficiently long, the receiver will not manage to demodulate all the messages. In this case, a statistical model can be used to estimate the number of aircraft present in the spot.
- For a spot in which the listening time is too long, all the messages are correctly demodulated and the number of aircraft can be obtained directly on this basis.

In an alternative embodiment, a new switching sequence can be determined from a ground station, said station transmitting this sequence to the satellite by using a signaling message so that the satellite implements it.

Figure 4:
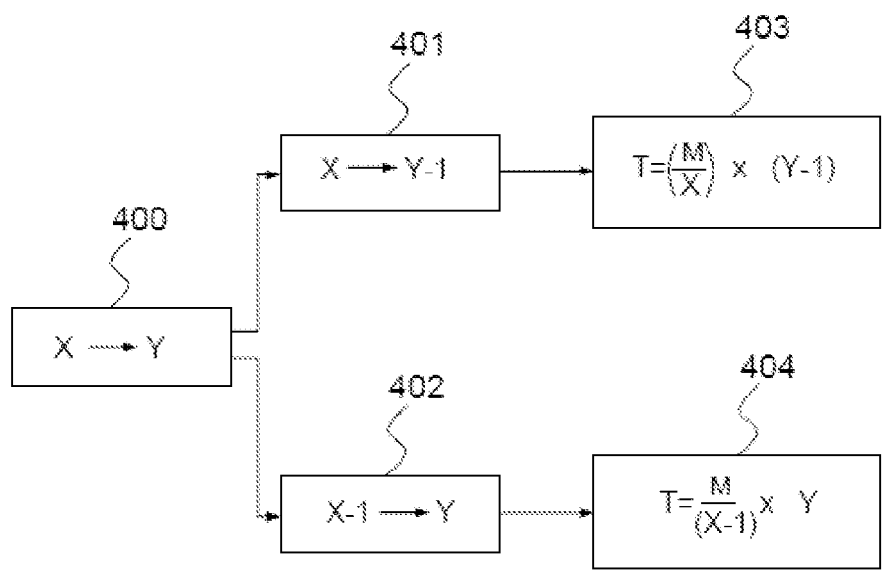
FIG. 4 illustrates the way in which a switching sequence can be adapted automatically and/or on command so as to take account of a failure of one or more reception modules.

FIG. 4 illustrates the manner in which a switching sequence can be adapted automatically in such a way as to take account of a failure of one or more reception modules.

Thus, if X beams are processed by Y reception modules 400, two situations 401, 402 may be encountered.

A first situation 401 corresponds to the case in which one of the reception modules is out of service. Such a failure can be taken into account to keep the system operational if the reception device comprises at least Y≥2 reception modules. Y−1 reception modules therefore remain operational. Thus, the X beams will have to be processed by these Y−1 modules. Consequently, the listening time Tec per beam will have to be proportionally reduced 403. If it is assumed that the listening time is the same for each spot, it can be adapted automatically by using the following expression:

$$Tec = \left(\frac{Tcom}{X}\right) \times (Y-1) \qquad (1)$$

A second situation 402 corresponds to the case in which one of the beams is no longer received. This may be due to a change of topology of the system or caused by a failure of an antenna processing subsystem 209 or of the switch 205. X−1 beams therefore remain to be processed. Thus, the X beams will have to be processed by these Y−1 modules. Consequently, the listening time per beam Tec, that is to say the duration of the switching phases if a beam is processed only once per phase, will have to be proportionally increased 404. If it is assumed that the listening time is the same for each spot, the switching sequence can be adapted automatically by using the following expression:

$$Tec = \frac{Tcom}{(X-1)} \times Y \qquad (2)$$

Taking the example of an ADS-B satellite, the listening time per beam with two reception modules is Tec=(Tcom/X)× Y=(30/9)×2=6.6 s.

If one of the reception modules is out of service, the listening time will be adapted automatically in such a way as to have Tec=(30/9)×1=3.3 s.

If a beam cannot be received, the listening time will be adapted automatically in such a way as to have Tec=(30/8)×2=7.5 s.

In the case where the reception of one of the beams is no longer possible, an identical listening time Tec for each spot can be implemented in the adapting of the spreading sequence, as described previously.

In an alternative embodiment, the switching sequence can be adapted in such a way that the listening time Tec is increased more significantly for the spots adjacent to the failed beam than for the others. This has the advantage of increasing the probability of reception of messages originating from the area covered by the failed spot, the adjacent spots overlapping at their edge.

Figure 5:
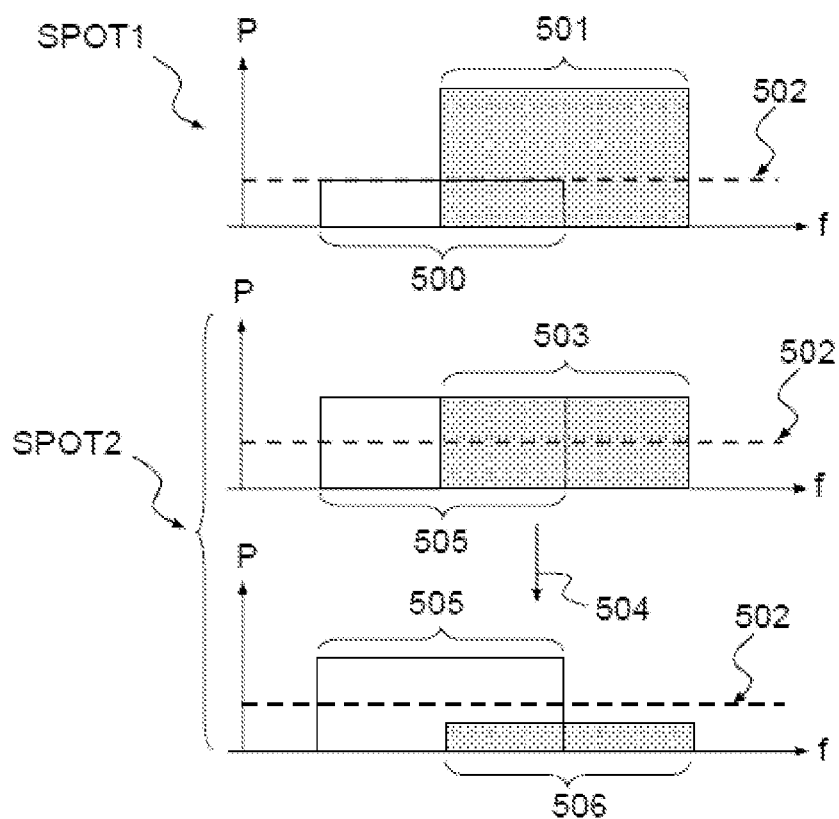
FIG. 5 illustrates how multi-user detection techniques can be used in the context of the invention.

FIG. 5 illustrates how the multi-user detection techniques can be used in the context of the invention.

The multi-user techniques, usually designated by the acronym MUD standing for "Multi-User Detection", can advantageously be implemented in the context of the invention. If a first and a second aircraft respectively transmit a first 500 and a second 501 surveillance message simultaneously and on overlapping frequency bands, the MUD technique can make it possible to correctly demodulate and decode these two messages. As an example, if, in a first spot SPOT1, the second signal conveying the second message 501 is received with a power at least equal to the sensitivity threshold 502 of the receiver and the first signal conveying the first message 500 is received with a power below this threshold, it is then possible for the reception device to demodulate and decode the second message but not the first message. In an adjacent spot SPOT2, the two signals 500, 501 may be received with the same power and therefore interfere with one another. This can have the consequence of a bad detection of the two messages. The MUD technique makes it possible to use the result of the detection of the second message 501 in the spot SPOT1 so as to subtract 504 the interference 503 corresponding to this second message in the SPOT2 and thus make it possible to detect the first message 505, the residual interference 506 after subtracting the second signal 505 then being sufficiently low to allow for this detection.

In the ADS-B type systems, the aircraft transmit in vertical polarization mode relative to the coordinate system of the aircraft, the horizontal being defined by the plane comprising the wings of said aircraft. However, the receiving antennas of the satellites operate in circular polarization mode, so a theoretical power loss of 3 decibels due to the mismatching of the polarizations therefore has to be taken into account.

In reality, because of the characteristics of the transmitting antennas, the polarization of the transmitted signal is elliptical. The movements of the aircraft as well as this ellipticity induce a loss in reception power less than or equal to 3 decibels in one of the circular polarizations and a loss in reception power greater than or equal to 3 decibels in the other.

In a preferred embodiment, the receiving antennas of the satellite are configured in such a way that, if two antennas are used to receive signals originating from two adjacent spots, the first operates in right circular polarization mode and the second in left circular polarization mode. Thus, when a signal conveying a signaling message is received by two antennas associated with two adjacent spots, the signal of stronger power is selected for the processing by the reception modules. The probability of detection of the surveillance messages is significantly improved thereby, in particular for the aircraft situated in areas of overlap between adjacent spots.

In an alternative embodiment, at least one of the antennas of the satellite operates both in right circular polarization mode and in left circular polarization mode.

The invention claimed is:

1. A reception device that can be installed in a satellite, the device comprising:
   means for forming a plurality of reception beams, a reception beam corresponding to a spot, all the spots forming a coverage area;
   at least one reception module comprising means for detecting surveillance messages from a reception beam; and
   means for periodically implementing a switching sequence adapted for switching at least one reception beam towards at least a reception module, said sequence being adapted to allow for the detection, during a predetermined period $T_{up}$, of at least one surveillance message by an aircraft present in the coverage area, said sequence being furthermore composed of a plurality of switching phases, a switching phase corresponding to a duration during which the signals transmitted by aircraft present in at least one spot are processed by the at least one reception module in such a way as to detect surveillance messages.

2. The reception device according to claim 1, further comprising two reception modules.

3. The reception device according to claim 2, wherein the reception device is configured to, when one of the reception modules is out of service, proportionally reduce a listening time $T_{ec}$ per reception beam corresponding to a time allotted for detecting surveillance messages during an application of the switching sequence.

4. The reception device according to claim 1, wherein the reception device is configured to, when one of the reception beams fails, adapt the switching sequence to increase a listening time per reception beam for the remaining reception beams.

5. The reception device according to claim 4, wherein the listening time per reception beam is increased more significantly for the spots adjacent to the failed reception beam than for the other spots.

6. The reception device according to claim 1, implementing the ADS-B standard.

7. The reception device according to claim 1, wherein the switching sequence comprises at least two switching phases of different durations.

8. The reception device according to claim 1, wherein the satellite is configured to adapt the switching sequence automatically and/or on command, according to a density of aircraft present in the spots of the area covered.

9. The reception device according to claim 1, wherein duration of the switching phases and/or a number of spots processed during each switching phase are chosen according to a density of aircraft present in the spots of the area covered.

10. The reception device according to claim 1, further comprising a module implementing multi-user detection based on interference suppression, a contribution to a signal received in a spot of a detected message being subtracted from signals received in adjacent spots processed during the same switching phase.

11. The reception device according to claim 1, further comprising two receiving antennas used to receive signals originating from two adjacent spots, with the first receiving antenna configured to operate in right circular polarization mode and the second receiving antenna configured to operate in left circular polarization mode.

12. The reception device according to claim 1, further comprising a plurality of receiving antennas, including at least one receiving antenna configured to operate both in right circular polarization mode and in left circular polarization mode.

13. An aircraft surveillance system comprising at least one communication satellite, a plurality of aircrafts and the reception device of claim 1.

* * * * *